United States Patent
Lee et al.

(10) Patent No.: US 11,520,177 B2
(45) Date of Patent: Dec. 6, 2022

(54) DISPLAY APPARATUS COMPRISING A PRINTED CIRCUIT BOARD INSTALLED ON A BOTTOM CHASSIS USING A MOUNTING BOSS HAVING A MOUNTING GROOVE THAT ACCOMMODATES THE PRINTED CIRCUIT BOARD

(71) Applicant: SAMSUNG ELECTRONICS CO., LTD., Suwon-si (KR)

(72) Inventors: Byung Jin Lee, Suwon-si (KR); Min Seok Lee, Suwon-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 0 days.

(21) Appl. No.: 17/285,806

(22) PCT Filed: Oct. 14, 2019

(86) PCT No.: PCT/KR2019/013434
§ 371 (c)(1),
(2) Date: Apr. 15, 2021

(87) PCT Pub. No.: WO2020/080770
PCT Pub. Date: Apr. 23, 2020

(65) Prior Publication Data
US 2021/0382336 A1    Dec. 9, 2021

(30) Foreign Application Priority Data
Oct. 16, 2018 (KR) .................. 10-2018-0123225

(51) Int. Cl.
*G02F 1/1333* (2006.01)
*G02F 1/13357* (2006.01)
*G02F 1/1345* (2006.01)

(52) U.S. Cl.
CPC ...... *G02F 1/133314* (2021.01); *G02F 1/1345* (2013.01); *G02F 1/13452* (2013.01); *G02F 1/133602* (2013.01)

(58) Field of Classification Search
CPC .................................. G02F 1/133328
See application file for complete search history.

(56) References Cited

U.S. PATENT DOCUMENTS

2002/0181219 A1* 12/2002 Paquin ............... H05K 7/142
   361/809
2006/0114662 A1*  6/2006 Liu .................... H05K 7/142
   361/759

(Continued)

FOREIGN PATENT DOCUMENTS

JP       2016197156 A  * 11/2016 ........... G02F 1/0126
KR  10-2006-0079520 A     7/2006

(Continued)

OTHER PUBLICATIONS

International Search Report dated Feb. 14, 2020 issued by the International Searching Authority in counterpart International Application No. PCT/KR2019/013434 (PCT/ISA/210).

*Primary Examiner* — Paul C Lee
(74) *Attorney, Agent, or Firm* — Sughrue Mion, PLLC

(57) ABSTRACT

The present invention relates to a display apparatus comprising a bottom chassis and a printed circuit board installed on the bottom chassis. The bottom chassis comprises a rear portion, a mounting boss protruding backwards from the rear portion, and a mounting groove concavely formed in one side of the mounting boss. The printed circuit board comprises a substrate portion in a plate shape, a through hole provided in the substrate portion to allow the rear end of the mounting boss to pass therethrough, and a solder applied to (Continued)

a partial area on one surface of the substrate portion, the partial area being adjacent to the through hole.

16 Claims, 4 Drawing Sheets

(56) References Cited

U.S. PATENT DOCUMENTS

2017/0164487 A1* 6/2017 Kim .................... G06F 1/1601
2017/0371198 A1 12/2017 Kim

FOREIGN PATENT DOCUMENTS

| KR | 10-2007-0060442 A | 6/2007 | |
|----|-------------------|--------|--|
| KR | 10-2008-0037391 A | 4/2008 | |
| KR | 10-2017-0053994 A | 5/2017 | |
| KR | 10-2017-0065786 A | 6/2017 | |
| WO | WO-9627147 A1 * | 9/1996 | ....... G02F 1/133308 |

* cited by examiner

DISPLAY APPARATUS COMPRISING A PRINTED CIRCUIT BOARD INSTALLED ON A BOTTOM CHASSIS USING A MOUNTING BOSS HAVING A MOUNTING GROOVE THAT ACCOMMODATES THE PRINTED CIRCUIT BOARD

TECHNICAL FIELD

The disclosure relates to a display apparatus including a printed circuit board installed on a bottom chassis.

BACKGROUND ART

Display apparatuses are devices for receiving image signals to display a screen, and include televisions, monitors, etc.

The display apparatus includes a display panel formed of a liquid crystal panel, a backlight for supplying light to the display panel, and a bottom chassis which accommodates the backlight and the rear surface of which is equipped with various printed circuit boards (PCBs) for controlling operations of the display apparatus.

The PCB is mounted at bosses formed on the bottom chassis through e.g., screws, but as the PCB is shaped like a plate, the worker has to fix several portions of the PCB with screws over and over and separately.

Furthermore, unavoidable electromagnetic noise occurs from the PCB while the PCB is operating, so the PCB needs to be grounded to the bottom chassis to avoid accumulation of the electromagnetic noise.

DISCLOSURE

Technical Problem

An aspect of the disclosure provides a display apparatus allowing a printed circuit board (PCB) to be more easily installed on a bottom chassis.

In addition, an aspect of the disclosure provides a display apparatus allowing a PCB to be grounded on a bottom chassis more stably.

Technical Solution

According to an aspect of the disclosure, a display apparatus includes a bottom chassis, and a printed circuit board (PCB) installed on the bottom chassis, wherein the bottom chassis includes a rear portion of a plate form, a mounting boss protruding rearward from the rear portion, and a mounting groove sunken on a side of the mounting boss, and wherein the PCB includes a substrate of a plate form, a through hole arranged at the substrate for a rear end of the mounting boss to pass through, and solder applied in an area on a surface of the substrate adjacent to the through hole.

The through hole extends to have width and length perpendicular to a direction of the width, and the solder is applied to be adjacent to one of both ends in a direction of the length of the through hole.

The mounting boss is formed into a truncated cone shape, and The mounting groove is formed in a portion of the mounting boss having a width corresponding to the through hole.

The mounting groove is formed by a hole provided at one side of the mounting boss.

The mounting groove includes a mounting portion extending in parallel with the rear portion, and a guide extending slantingly from the mounting portion.

The guide extends slantingly backwards, and the solder is applied on the rear surface of the substrate.

The guide extends slantingly forwards, and the solder is applied on a front surface of the substrate.

The guide includes a pair of guides extending forward and backward from the mounting portion, and the solder is applied on each of the front surface and the rear surface of the substrate.

According to an aspect of the disclosure, a display apparatus includes a bottom chassis, and a printed circuit board (PCB) installed on the bottom chassis, wherein the bottom chassis includes a rear portion of a plate form, a mounting boss protruding rearward from the rear portion, and a mounting groove sunken on a side of the mounting boss, and wherein the PCB includes a substrate of a plate form and a through hole arranged at the substrate for a rear end of the mounting boss to pass through.

Advantageous Effects

A display apparatus according to an aspect of the disclosure may allow a printed circuit board (PCB) to be installed on a bottom chassis without an extra member.

A display apparatus according to an aspect of the disclosure may allow a PCB to be grounded more stably to a bottom chassis.

MODES OF THE INVENTION

Figure 1:
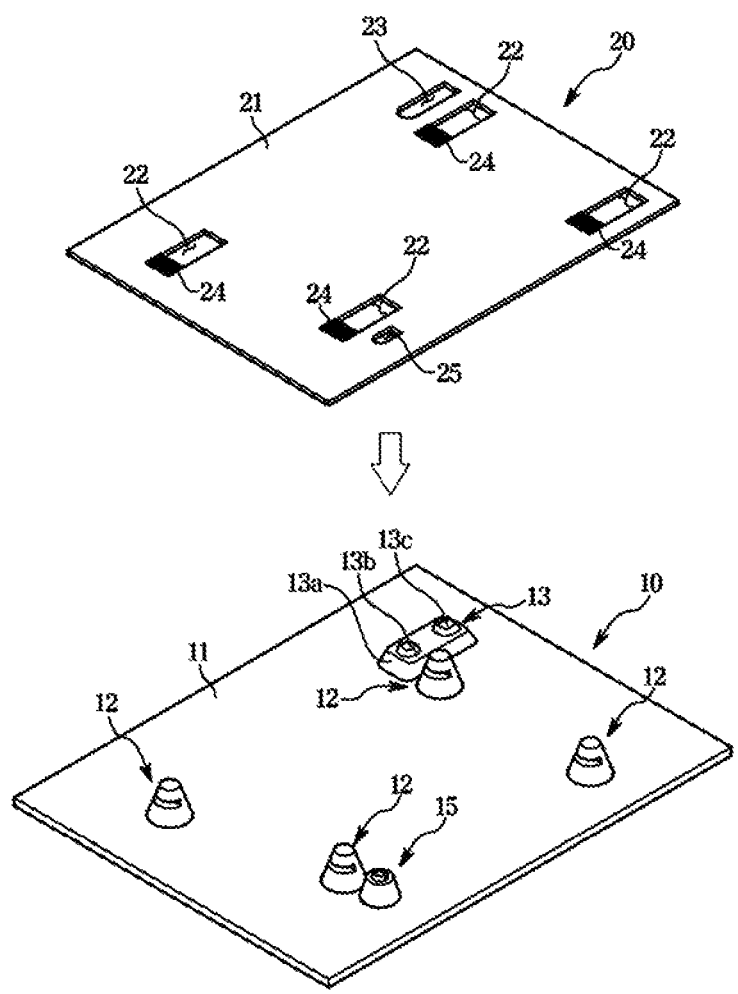
FIG. 1 is a perspective view illustrating a state of a printed circuit board (PCB) of a display apparatus separated from a bottom chassis, according to a first embodiment of the disclosure.

Embodiments and features as described and illustrated in the disclosure are only preferred examples, and various modifications thereof may also fall within the scope of the disclosure.

Throughout the drawings, like reference numerals refer to like parts or components.

The terminology used herein is for the purpose of describing particular embodiments does not limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~and/or~," or the like.

The terms "upper", "lower", "top", "bottom", "front" and "rear" as herein used are defined with respect to the drawings, but the terms may not restrict the shape and position of the respective components.

A display apparatus in accordance with a first embodiment of the disclosure will now be described in detail with reference to accompanying drawings.

Although not shown, the display apparatus includes a display panel, a backlight for supplying light to the display panel, and a plurality of optical sheets arranged between the display panel and the backlight to enhance characteristics of the light supplied from the backlight.

Figure 2:
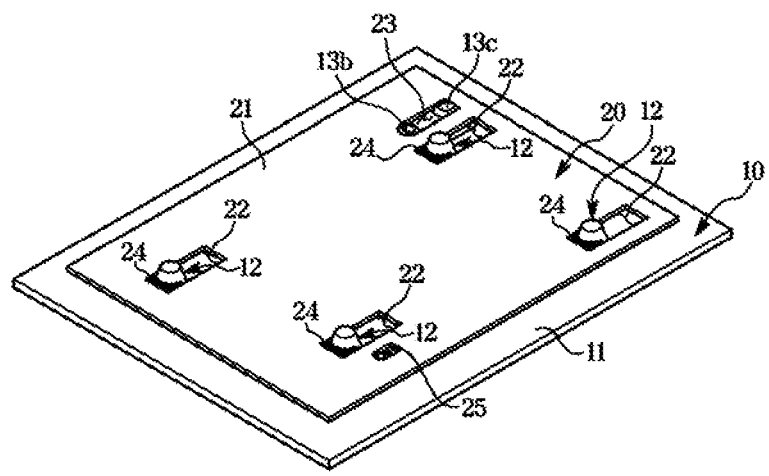
FIG. 2 is a perspective view illustrating a state of the PCB of the display apparatus coupled with the bottom chassis, according to the first embodiment of the disclosure.

Furthermore, the display apparatus, as shown in FIGS. 1 and 2, includes a bottom chassis 10 and printed circuit boards (PCBs) 20 installed on the bottom chassis 10 to control operations of the display apparatus.

The PCBs 20 installed on the bottom chassis 10 may include a power board for supplying power to the display apparatus, a panel driving board for driving the display panel, a timing control board for sending an image signal to the display panel, and a signal processing board for processing images and voice signals.

When the PCB 20 is installed on the bottom chassis 10, the PCB 20 is located above the bottom chassis 10, and when the display apparatus is used, the PCB 20 is arranged behind the bottom chassis 10.

A mutual positional relation between the PCB 20 and the bottom chassis 10 based on an occasion when the display apparatus is used will now be described. Specifically, the lower side of the drawing is the front side of the bottom chassis 10 and the PCB 20, and the upper side of the drawing is the rear side of the bottom chassis 10 and the PCB 20.

The bottom chassis 10 includes a rear portion 11 formed to have the shape of a rectangular plate and defining the rear surface of the bottom chassis 10, and mounting bosses 12 protruding backward from the rear portion 11 for the PCB 20 to be installed on the bottom chassis 10.

Figure 3:
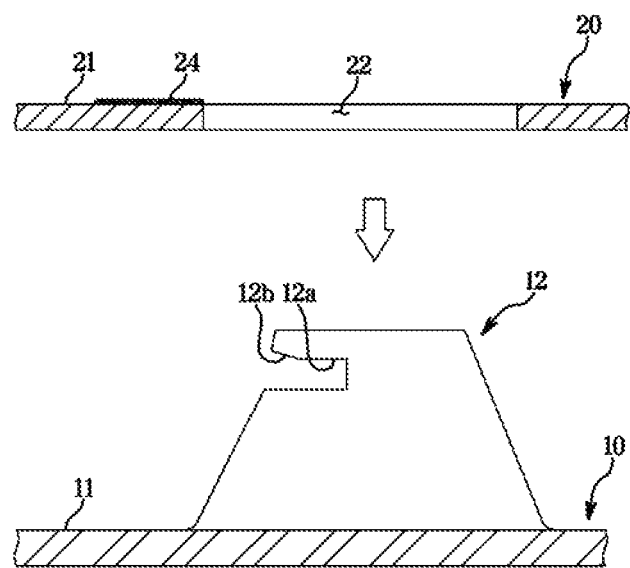
FIGS. 3 to 5 are partial cross-sectional views illustrating a process of the PCB of the display apparatus being coupled with the bottom chassis, according to the first embodiment of the disclosure.

The mounting boss 12 includes a mounting groove formed on one side to have the PCB 20 installed thereat, as shown in FIG. 3.

The mounting boss 12 has the form of almost a truncated cone, and the mounting groove is formed in a portion of the mounting boss 12, which has width corresponding to a through hole 22 as will be described later.

The mounting groove is formed by a hole provided at one side of the mounting boss 12. The mounting groove includes a mounting portion 12a which extends in parallel with the rear portion 11 and to which the PCB 20 is inserted, and a guide 12b extending slantingly from the mounting portion 12a to guide the PCB 20 to be inserted to the mounting portion 12a. The guide 12b extends backward slantingly.

The bottom chassis 10 includes four mounting bosses 12 to install the single PCB 20, in which case both upper sides and both lower sides of the PCB 20 are mounted on the bottom chassis 10 through the four mounting bosses 12. It is not, however, limited thereto, and the number and positions of the mounting bosses 12 may be variously changed according to the shape or size of the PCB 20.

The PCB 20 includes a substrate 21 formed into a plate shape, through holes 22 arranged on the substrate 21 for the rear end of each mounting boss 12 to pass through, and solder 24 applied on one surface of the substrate 21 and adjacent to the through holes.

The through holes 22 are formed on both upper sides and both lower sides of the PCB 20 to correspond to the four mounting bosses 12. That is, four through holes 22 are provided. The number and positions of the through holes 22 may also be changed to correspond to the mounting bosses 12.

The through hole 22 has width and length perpendicular to the width. In the drawing, the through hole 22 extends to have length in the left and right direction. Accordingly, the worker who installs the PCB 20 on the bottom chassis 10 may install the PCB 20 onto the bottom chassis 10 by moving the PCB 20 to the left or right.

The solder 24 is applied to be adjacent to one of both ends in the length direction of the through hole 22.

To limit movement of the PCB 20 while the PCB 20 is installed on the bottom chassis 10, the bottom chassis 10 includes a catching boss 13 protruding backward from the bottom chassis 10, and the PCB 20 includes a catching hole 23 formed in a corresponding position to the catching boss 13.

The catching boss 13 includes a supporter 13a formed to have a rear end having a larger width than the catching hole 23 to support the rear surface of the PCB 20, and catching projections 13b and 13c protruding from the rear end of the supporter 13a and inserted to the catching hole 23 to limit movement of the PCB 20. The catching boss 13 is formed on the other side of the bottom chassis 10 (right side in the drawing), and the catching hole 23 is formed on the other side of the PCB (right side in the drawing).

The catching hole 23 has a smaller width than the rear end of the supporter 13a, and extends to have length in parallel with the length direction of the through hole 22.

The catching projections 13b and 13c includes a first catching projection 13b and a second catching projection 13c arranged in parallel in the length direction. While the PCB 20 is installed on the bottom chassis 10, the first catching projection 13b is placed in an inner portion of one side (left side in the drawing), and the second catching projection 13c is placed in an inner portion of the other side (right side in the drawing). The other side (right side in the drawing) of the second catching projection 13c is formed into a straight shape to be stuck on the other inner side of the catching hole 23

As the first catching projection 13a is supported on an inner side of the catching hole 23 (left side in the drawing), it even partially serves as a stopper to limit a right portion of the PCB 20 to moving more than a certain distance to the right side.

To limit a moving distance of the PCB 10 while the PCB 20 is being installed on the bottom chassis 20, the bottom chassis 10 includes a stopper boss 15 formed on one side (right side in the drawing), and the PCB 20 includes a stopper hole 25 formed to correspond to the stopper boss 15.

Accordingly, a projection formed at the rear end of the stopper boss 15 is supported on an inner surface of one side (left side in the drawing) of the stopper hole 25 to limit a left portion of the PCB 20 to moving more than a certain distance to the right.

A procedure in which the PCB 20 is mounted on the bottom chassis 10 in the display apparatus having the aforementioned structure will now be described with reference to drawings.

Figure 4:
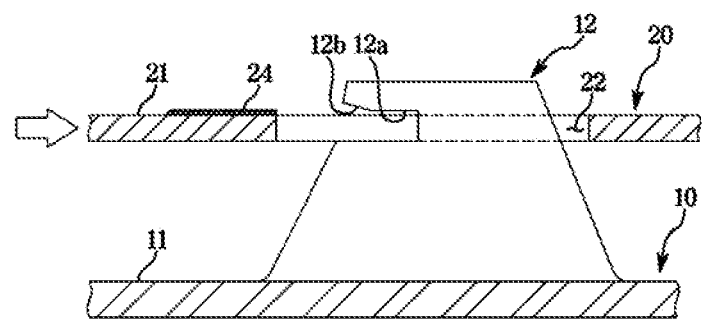

As shown in FIG. 3, the PCB 20 located behind (upper side of the drawing) the bottom chassis 10 is moved forward (in the arrow direction in the drawing) such that the rear end of the mounting boss 12 passes through the through hole 22 as shown in FIG. 4.

Figure 5:
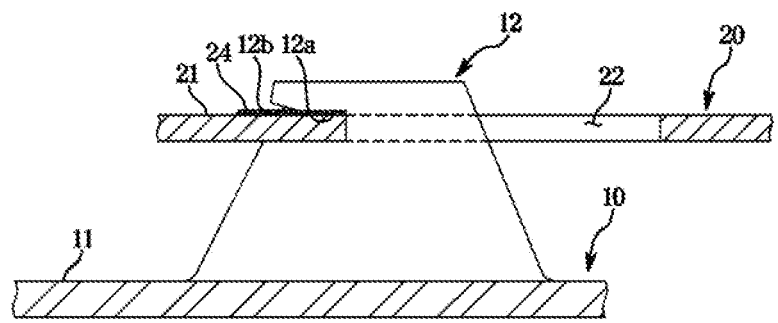

As shown in FIG. 5, when the worker moves the PCB 20 in a direction (the arrow direction), a portion of the substrate 21 adjacent to the through hole 22 and the solder 24 are moved into the mounting groove.

The solder 24 comes into contact with the guide 12b because of the movement of the PCB 20. In this state, when the worker applies force to keep moving the PCB 20, a portion of the solder 24, which is a soft material, contacting the guide 12b is deformed so that the PCB 20 is moved.

Accordingly, the portion of the substrate 21 adjacent to the through hole 22 and the solder 24 are inserted to the mounting portion 12a, so that the PCB 20 is stably mounted on the bottom chassis without an extra member such as a screw.

Furthermore, as the solder 24 and the inner surface of the mounting groove contact each other stably, the PCB 20 is stably grounded to the bottom chassis 10 via the solder 24 and the inner surface of the mounting portion 12a.

Although the mounting groove includes the guide 12b that extends slantingly to guide the PCB 20 to be more easily installed on the bottom chassis 10, it is not limited thereto. For example, the mounting groove may include only the mounting portion 12a that extends in parallel with the rear portion 11.

Furthermore, although it is shown that the guide 12b is formed to be slanted backward and the solder 24 is applied on the rear surface of the PCB 20, it is merely an example and not limited thereto.

Figure 6:
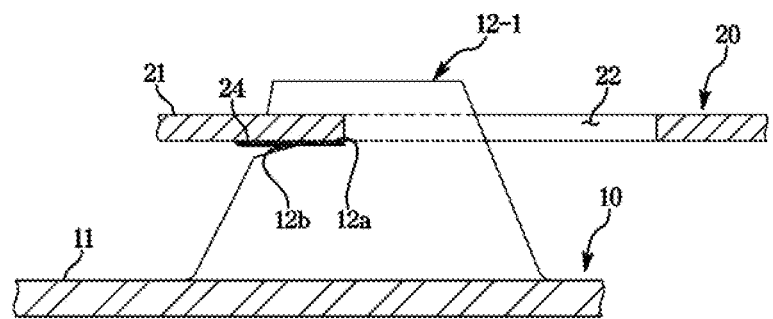
FIG. 6 is a partial cross-sectional view illustrating a state of a PCB of a display apparatus coupled with a bottom chassis, according to a second embodiment of the disclosure.

As shown in FIG. 6, it is also possible that a mounting groove of a mounting boss 12-1 includes the mounting portion 12a and the guide 12b extending slantingly forward from the mounting portion 12a, and that the solder 24 is applied on the front surface of the PCB 20.

Figure 7:
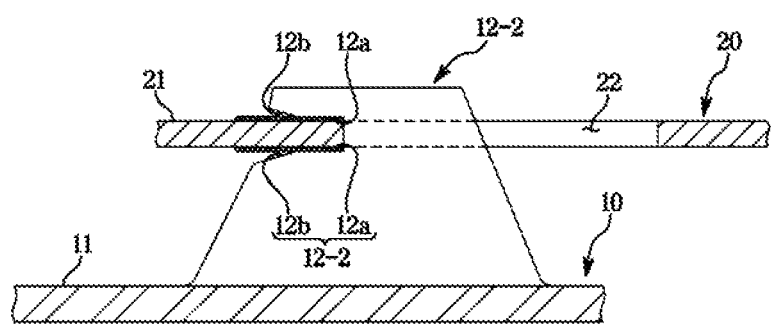
FIG. 7 is a partial cross-sectional view illustrating a state of a PCB of a display apparatus coupled with a bottom chassis, according to a third embodiment of the disclosure.

Furthermore, as shown in FIG. 7, it is also possible that a mounting groove of a mounting boss 12-2 includes the mounting portion 12a and a pair of guides 12b extending slantingly forward and backward from the mounting portion 12a, and that the solder 24 is applied on the front and rear surfaces of the PCB 20.

The scope of the present disclosure is not limited to the aforementioned embodiments. It will be understood by those of ordinary skill in the art that various changes in form and details may be made therein without departing from the spirit and scope of the disclosure as defined by the appended claims and their equivalents.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
   a bottom chassis, and
   a printed circuit board (PCB) installed on the bottom chassis,
   wherein the bottom chassis includes a rear portion of a plate form, a mounting boss protruding rearward from the rear portion, and a mounting groove sunken on a side of the mounting boss, and
   wherein the PCB comprises a substrate of a plate form, a through hole arranged at the substrate for a rear end of the mounting boss to pass through, and solder applied in an area on a surface of the substrate adjacent to the through hole, and
   wherein the mounting groove is configured to accommodate at least a portion of the PCB to support at least the portion of the PCB, and the mounting groove comprises a mounting portion configured to contact the solder so that the solder couples the mounting boss and the PCB when the PCB is accommodated in the mounting groove.

2. The display apparatus of claim 1, wherein the through hole extends to have a width and a length perpendicular to a direction of the width, and
   wherein the solder is applied to be adjacent to one of both ends in a direction of the length of the through hole.

3. The display apparatus of claim 1, wherein the mounting boss is formed into a truncated cone shape, and
   wherein the mounting groove is formed in a portion of the mounting boss having a width corresponding to the through hole.

4. The display apparatus of claim 1, wherein the mounting groove is formed by a hole provided at one side of the mounting boss.

5. The display apparatus of claim 1, wherein the mounting portion extends in parallel with the rear portion, and
   wherein the mounting groove further comprises a guide extending slantingly from the mounting portion.

6. The display apparatus of claim 5, wherein the guide extends slantingly backward, and
   wherein the solder is applied onto a rear surface of the substrate.

7. The display apparatus of claim 5, wherein the guide extends slantingly forward, and
   wherein the solder is applied onto a front surface of the substrate.

8. The display apparatus of claim 5, wherein the guide comprises a pair of guides extending forward and backward from the mounting portion, and
   wherein the solder is applied on each of front and rear surfaces of the substrate.

9. A display apparatus comprising:
   a bottom chassis, and
   a printed circuit board (PCB) installed on the bottom chassis,
   wherein the bottom chassis includes a rear portion of a plate form, a mounting boss protruding rearward from the rear portion, and a mounting groove sunken on a side of the mounting boss, and
   wherein the PCB comprises a substrate of a plate form, a through hole arranged at the substrate for a rear end of the mounting boss to pass through, and solder applied in an area on a surface of the substrate adjacent to the through hole,
   wherein the mounting groove is configured to accommodate at least a portion of the PCB to support the portion of the PCB, and the mounting groove comprises a mounting portion configured to contact the solder so that the solder combines the mounting boss and the PCB when the PCB is accommodated in the mounting groove, wherein the bottom chassis comprises a catching boss protruding backward from the bottom chassis to limit a movement of the PCB when the PCB is installed on the bottom chassis, and wherein the PCB comprises a catching hole formed in a position corresponding to the catching boss.

10. The display apparatus of claim 9, wherein the mounting portion extends in parallel with the rear portion, and wherein the mounting groove further comprises a guide extending slantingly backward from the mounting portion.

11. The display apparatus of claim 10, wherein the area in which the solder is applied is an area on a rear surface of the substrate adjacent to the through hole.

12. The display apparatus of claim 9, wherein the mounting portion extends in parallel with the rear portion, and wherein the mounting groove further comprises a guide extending slantingly forward from the mounting portion.

13. The display apparatus of claim 12, wherein the area in which the solder is applied is an area on a front surface of the substrate adjacent to the through hole.

14. The display apparatus of claim 9, wherein the mounting portion extends in parallel with the rear portion, and the mounting groove further comprises a pair of guides extending slantingly forward and backward from the mounting portion.

15. The display apparatus of claim 14, wherein the PCB further comprises solder applied on some areas on front and rear surfaces of the substrate adjacent to the through hole.

16. The display apparatus of claim 1, wherein the solder couples the mounting boss and the PCB without an extra member.

* * * * *